Figure 1:
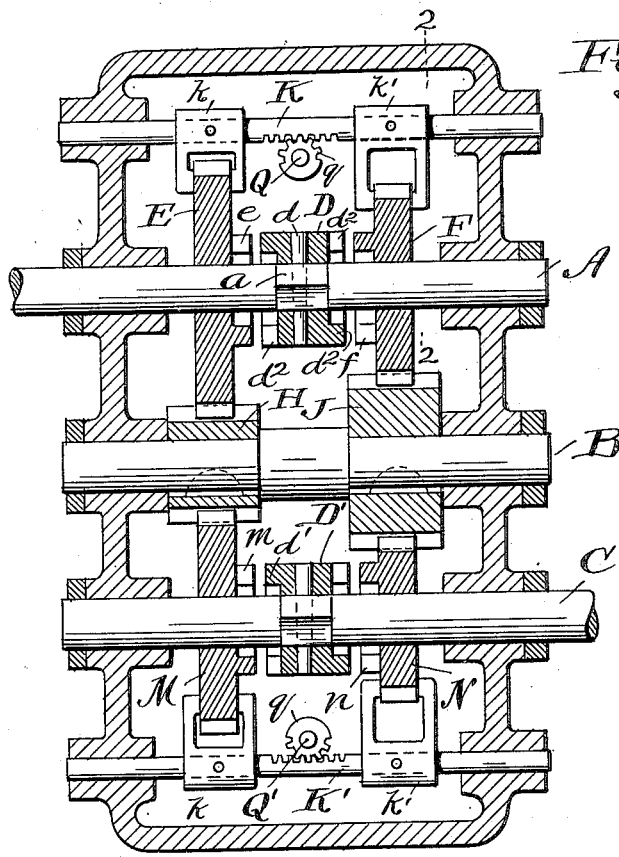

A. P. WEIGEL.
SPEED GEARING.
APPLICATION FILED OCT. 18, 1913.

1,101,597.

Patented June 30, 1914.

Witnesses
E. B. Gilchrist
L. I. Porter.

Inventor
Albert P. Weigel
by Thurston & Kwis
Attorneys

UNITED STATES PATENT OFFICE.

ALBERT P. WEIGEL, OF KOKOMO, INDIANA, ASSIGNOR TO KOKOMO NAIL AND BRAD COMPANY, OF KOKOMO, INDIANA, A CORPORATION OF INDIANA.

SPEED-GEARING.

1,101,597.  Specification of Letters Patent.  Patented June 30, 1914.

Application filed October 18, 1913. Serial No. 796,052.

*To all whom it may concern:*

Be it known that I, ALBERT P. WEIGEL, a citizen of the United States, residing at Kokomo, in the county of Howard and State of Indiana, have invented a certain new and useful Improvement in Speed-Gearing, of which the following is a full, clear, and exact description.

This invention is an improved always-in-mesh change speed gearing. In the form shown it is especially designed for use on some form of machine tool for causing the tool carrying spindle to rotate at any of four different speeds without varying the speed of the driving shaft. But the invention either in the form shown, or slightly modified as to details, is adapted for a variety of specifically different uses.

The objects of the invention are to provide change speed gearing which shall occupy less space, but which shall nevertheless be stronger than change speed gearing of like capacity, as heretofore constructed.

The distinction between my gearing and the old gearing which most nearly resembles it is this, viz. that in the old gearing, a clutch sleeve, which was compelled to rotate with the shaft but was movable lengthwise thereon, was interposed between two gears which had no movement lengthwise of the shaft, and which were rotatable independently of the shaft, in order that by the movement of the clutch sleeve in one direction or the other either gear could be connected at will with said shaft; whereas in my construction the intermediate clutch member is immovably fixed to the shaft, while two gears located on opposite sides thereof are associated with the mechanism for moving them simultaneously along the shaft in either direction, and thereby causing either to be clutched to the intermediate sleeve and thereby to the shaft.

In the old construction it is necessary to provide either the shaft or the clutch sleeve with a fairly long groove or tongue and to provide the other part with a tongue or groove for engagement therewith, whereby the lengthwise movement of the sleeve on the shaft was permissible without breaking the operative driving engagement between the shaft and sleeve. In this construction, however, the tongue in any practical construction could not be very thick, and it could not project out very far from the part which carried it. Its strength was therefore limited so that it was frequently sheared off by the strains to which the load subjected it. Moreover the clutch sleeve had to be long enough for an annular groove or its equivalent to be engaged by the sleeve moving intrumentality. With my new construction, however, the clutch sleeve is immovable lengthwise of the shaft, and therefore may be shortened because it need not be provided with a circumferential groove or its equivalent. Likewise in my construction a tongue and groove driving connection between the sleeve and shaft are not required. The sleeve may be fitted onto a square part of the shaft and may be securely pinned thereto. This form of driving connection between a clutch sleeve and a shaft can never be broken, and thereby it can transmit heavier loads than can be transmitted by any practical tongue and groove connection.

Figure 2:
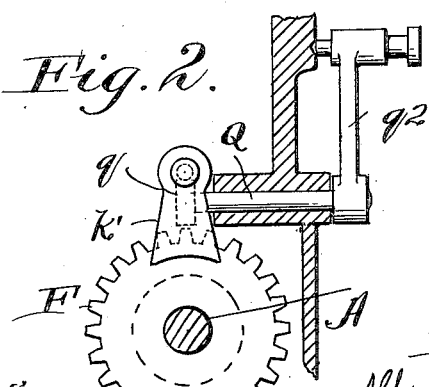

In the drawing Figure 1 is a sectional view of the invention, and Fig. 2 is a sectional view through one side of the gear case in the plane indicated by line 2—2 on Fig. 1.

Referring to the parts by letters, A represents the driving shaft. B represents an intermediate shaft and C the driven shaft. On a squared part $a$ of shaft A the clutch sleeve or collar D is fitted and secured by the pin $d$. Gears E and F are loosely mounted on said shaft A on opposite sides of said clutch collar. Clutch jaws $d^2$, are formed on opposite ends of the clutch collar; and other clutch jaws $e$ and $f$ are formed on the hubs of the two gears E and F respectively, in position to interlock with the jaws $d^2$ on the clutch collar D.

Gears H and J are keyed fast to the shaft B. Gears M and N are mounted loosely on shaft C; and between them the collar $D^1$ is secured to said shaft C just as collar D is secured to shaft A. Collar $D^1$ is formed with clutch jaws $d^1$ on opposite ends for engagement with the clutch jaws $m$, $n$, on the hubs of the gears M and N. Gears E and M are in mesh with the intermediate gear H, which latter gear is wide enough to preserve that engagement, notwithstanding the movement lengthwise of the shafts of the two gears E and M. The gears F and N are likewise in mesh with the intermediate gear J which is wide enough to preserve this engagement as the gear N are moved. Gears E and F are of different diameters, and so also are gears M and N.

Adjacent to the gears E and F is an endwise movable sliding rod K carrying two forked jaws $k$, $k^1$ which respectively engage the gears E and F, the forks of each jaw lying in substantial engagement on opposite sides of the associated gear. A similar rock bar $K^1$ is mounted adjacent to gears M and N and carries forked jaws $k$, $k^1$, which engage the sides of said gears. Each of these bars K, $K^1$ in the form shown is a rack bar, and with each rack bar a pinion $q$ engages. These two pinions $q$, $q$, are secured respectively to two shafts Q, $Q^1$, which are mounted in bearings in the gear case and have operating arms $q^2$ secured to their projecting outer ends. By rocking the upper shaft Q the rack bar K will be moved, and so will both gears E and F. If moved in one direction, gear E will be clutched to the shaft, and gear F will remain unclutched from the shaft. By moving it in the opposite direction the reverse of conditions will be brought about. By similar movements of the other rack bar either gear M or N will be moved to cause its jaws to interlock with the associated jaws on the clutch sleeve. It is obvious that the two pairs of gears may be so moved that either gear of one pair may be connected with its shaft, while either gear of the other pair is connected with its shaft; and thus the driving shaft C may be driven at any of four different speeds without changing the speed of the driving shaft A.

Having described my invention, I claim:

1. In speed gearing, the combination of three shafts, two gears of different diameters fixed to the intermediate shaft, a clutch member rigidly fixed to one of the other shafts, two gears which are slidably and rotatably mounted on the last named shaft on opposite sides of and adjacent to said clutch member, each of said gears being provided with clutching devices, a gear shifter engaging both of said sliding gears for simultaneously moving them, the one into and the other out of engagement with said clutch member, and a gear connection between the intermediate shaft and the third shaft referred to.

2. In speed gearing, the combination of three shafts, two gears of different diameters fixed to the intermediate shaft, a clutch member immovably fixed to each of the other two shafts, a pair of gears slidably and rotatably mounted on each of the other two shafts and on opposite sides of the clutch member thereon, each of said sliding gears being provided with clutch devices for engaging the adjacent clutch member, and said sliding gears being permanently in mesh with gears on the intermediate shaft, two gear shifters, one engaging both sliding gears on one shaft, and the other engaging both sliding gears on the other shaft, whereby either pair of gears may be moved independently of the other pair, and the two gears of each pair will be moved simultaneously to cause one to engage and the other to disengage the intermediate clutch member.

3. In speed gearing, the combination of three shafts, two wide gears of different diameters fixed to the intermediate shaft, two narrow gears of different diameters which are slidably and rotatably mounted on one of the other shafts and meshing respectively with the two gears on the intermediate shaft, each of said two sliding gears being provided with clutching devices, a clutch member fixed to said shaft between the two sliding gears thereon, two other narrower gears of different diameters which are slidably and rotatably mounted on the third shaft in mesh respectively with the two gears on the intermediate shaft, each of the last two named sliding gears being provided with clutch devices, a clutch member rigidly fixed to the third shaft between the two sliding gears thereon, a gear case in which the said shafts are mounted and in which the gears referred to are inclosed, a gear shifter in said gear case engaging both of the sliding gears mounted on one of said shafts, means operable from outside the gear case for moving said gear shifter, a second gear shifter in the gear case engaging the two sliding gears on the other shaft, and means operable from outside the gear case for moving the last named gear shifter.

In testimony whereof, I hereunto affix my signature in the presence of two witnesses.

ALBERT P. WEIGEL.

Witnesses:
I. N. HAIR,
DON M. OSBORNE,

---

Copies of this patent may be obtained for five cents each, by addressing the "Commissioner of Patents, Washington, D. C."